United States Patent
Otsuka et al.

(10) Patent No.: US 9,837,213 B2
(45) Date of Patent: Dec. 5, 2017

(54) CERAMIC ELECTRONIC COMPONENT

(71) Applicant: TAIYO YUDEN CO., LTD., Taito-ku, Tokyo (JP)

(72) Inventors: Koji Otsuka, Takasaki (JP); Tomoaki Nakamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 20 days.

(21) Appl. No.: 14/781,017

(22) PCT Filed: Mar. 17, 2014

(86) PCT No.: PCT/JP2014/057053
§ 371 (c)(1),
(2) Date: Sep. 28, 2015

(87) PCT Pub. No.: WO2014/162854
PCT Pub. Date: Oct. 9, 2014

(65) Prior Publication Data
US 2016/0042868 A1  Feb. 11, 2016

(30) Foreign Application Priority Data

Apr. 3, 2013  (JP) .................................. 2013-077490

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/12* (2013.01); *H01G 4/232* (2013.01); *H01G 4/248* (2013.01)

(58) Field of Classification Search
CPC ............ H01G 4/30; H01G 4/012; H01G 4/12; H01G 4/232; H01G 4/248
(Continued)

(56) References Cited

U.S. PATENT DOCUMENTS

2004/0129919 A1* 7/2004 Horikawa ............. C04B 35/493
                                                          252/62.9 PZ
2004/0145856 A1* 7/2004 Nakamura ........... H01G 4/1227
                                                          361/311
(Continued)

FOREIGN PATENT DOCUMENTS

JP            0888138 A      4/1996
JP            11162771 A     6/1999
(Continued)

OTHER PUBLICATIONS

International Search Report (ISR) dated May 13, 2014, issued for International application No. PCT/JP2014/057053.
(Continued)

*Primary Examiner* — Eric Thomas
*Assistant Examiner* — Michael P McFadden
(74) *Attorney, Agent, or Firm* — Law Office of Katsuhiro Arai

(57) ABSTRACT

In an embodiment of a ceramic electronic component, an external electrode 12 of a capacitor 10 has one first planar part SEa of roughly rectangular profile positioned on a surface that specifies the length dimension of the ceramic chip 11, as well as four second planar parts SEb of roughly rectangular profile positioned on both surfaces that specify the height dimension, and both surfaces that specify the width dimension, of the ceramic chip 11 and also continuing to the first planar part SEa. The second planar part SEb is constituted by a baked metal film 12a formed on the exterior surface of the ceramic chip 11 and a plated metal film 12b
(Continued)

formed on the exterior surface of the baked metal film 12*a* via an adhesive force mitigation film 12*c*.

15 Claims, 6 Drawing Sheets

(51) Int. Cl.
*H01G 4/232* (2006.01)
*H01G 4/12* (2006.01)
*H01G 4/248* (2006.01)

(58) Field of Classification Search
USPC ..................................................... 361/306.3
See application file for complete search history.

(56) References Cited

U.S. PATENT DOCUMENTS

| | | | | |
|---|---|---|---|---|
| 2006/0145401 | A1* | 7/2006 | Mihara | H01C 1/148 |
| | | | | 264/618 |
| 2007/0215379 | A1* | 9/2007 | Komatsu | H01G 4/2325 |
| | | | | 174/258 |
| 2010/0128412 | A1* | 5/2010 | Nishihara | H01G 4/30 |
| | | | | 361/306.3 |
| 2015/0340155 | A1* | 11/2015 | Fukunaga | H01G 4/012 |
| | | | | 361/301.4 |

FOREIGN PATENT DOCUMENTS

| | | |
|---|---|---|
| JP | 2009200421 A | 9/2009 |
| JP | 2010109238 A | 5/2010 |
| JP | 2011134875 A | 7/2011 |
| JP | 201294585 A | 5/2012 |
| JP | 201427085 A | 2/2014 |

OTHER PUBLICATIONS

A Notification of Reason for Refusal issued by Korean Intellectual Property Office, dated Jan. 4, 2017, for Korean counterpart application No. 1020157023427.

A Notification of Reasons for Refusal issued by the Japanese Patent Office, dated Dec. 28, 2016, for Japanese counterpart application No. 2013-077490.

Notification of Reason for Refusal issued by Korean Intellectual Property Office, dated Aug. 2, 2016, for Korean counterpart application No. 1020157023427.

Notification of Transmittal of Translation of the International Preliminary Report on Patentability (PCT/IB/338) dated Oct. 15, 2015, with International Preliminary Report on Patentability (PCT/IB/373) and Written Opinion of the International Searching Authority (PCT/ISA/237), for corresponding international application PCT/JP2014/057053.

* cited by examiner

[Fig. 1]
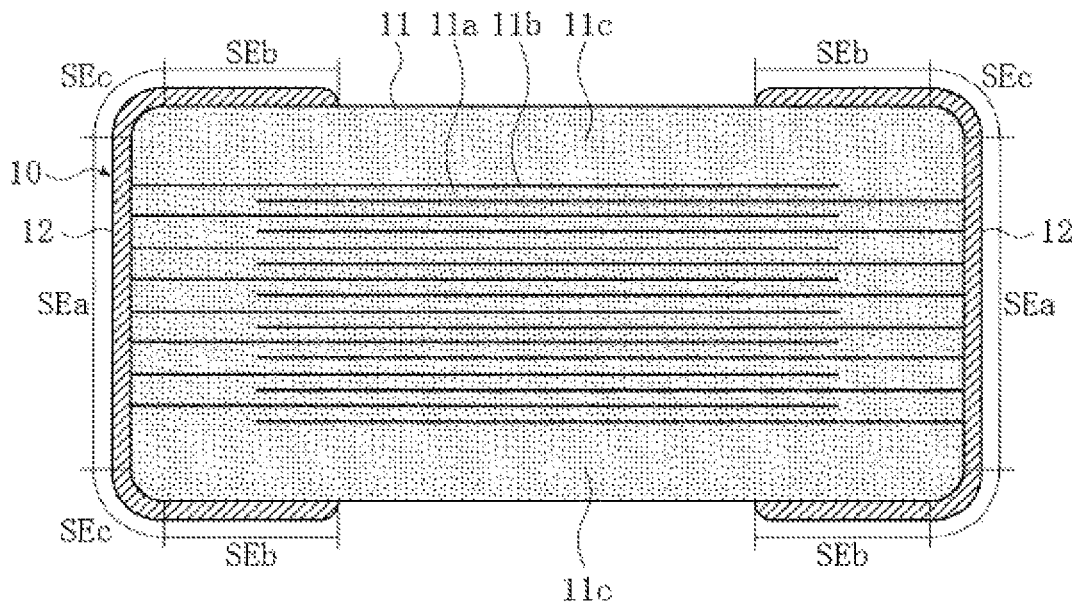
[Fig. 2]
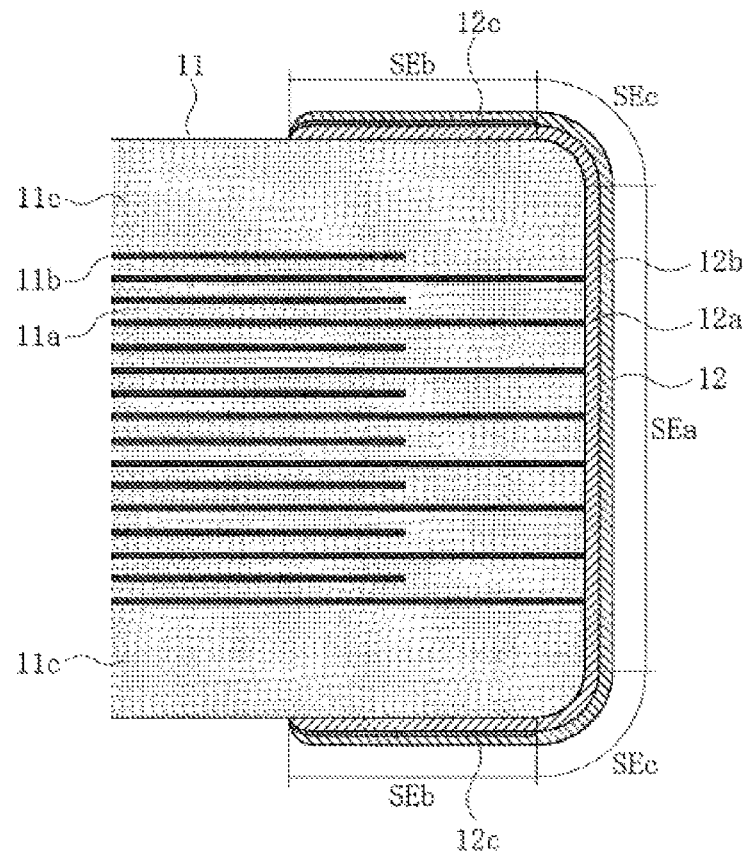

[Fig. 3]
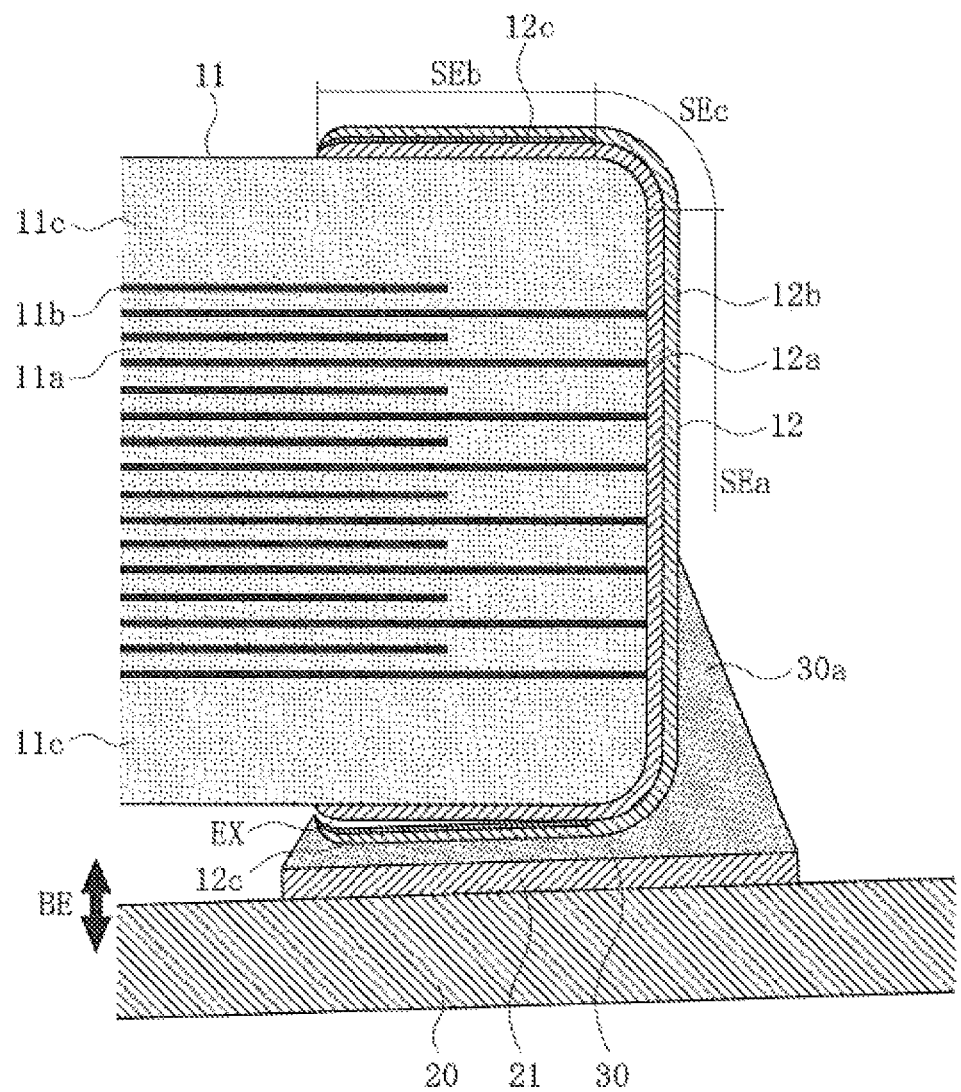

[Fig. 4]
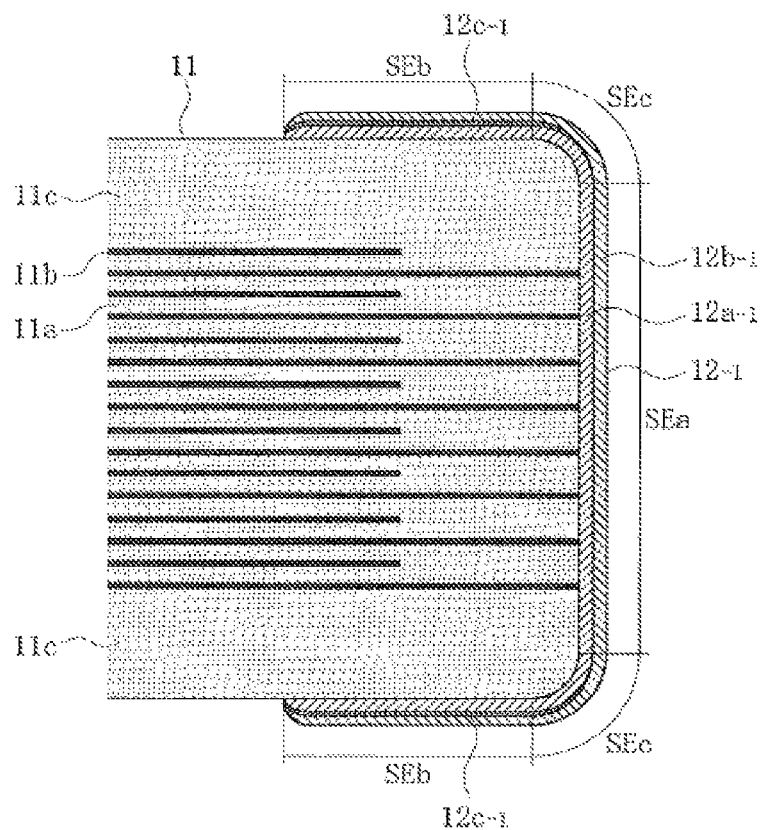
[Fig. 5]
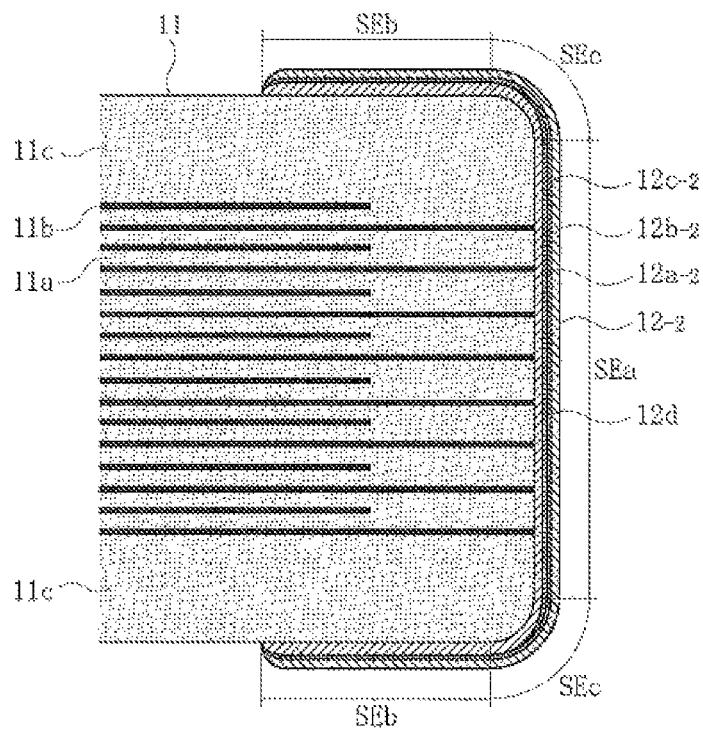

[Fig. 6]
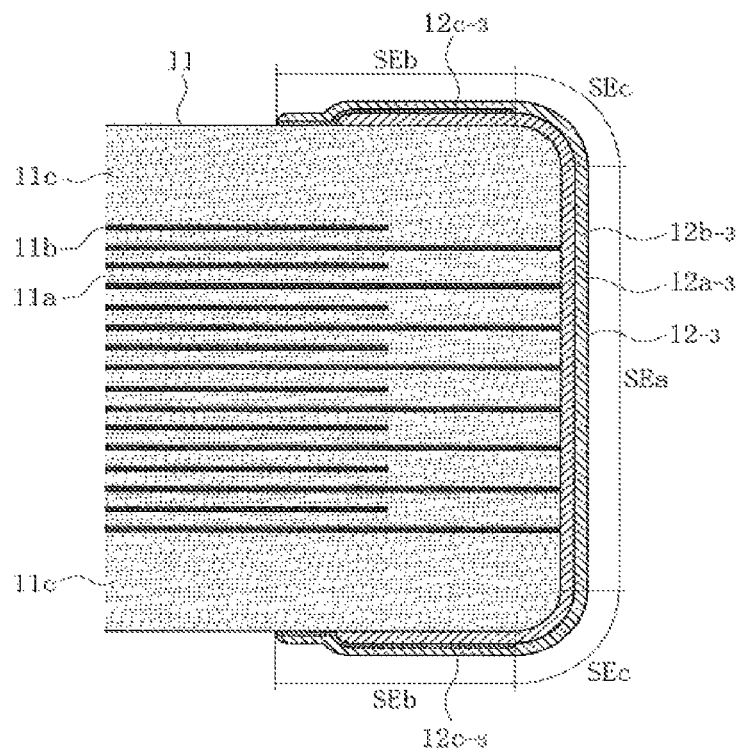
[Fig. 7]
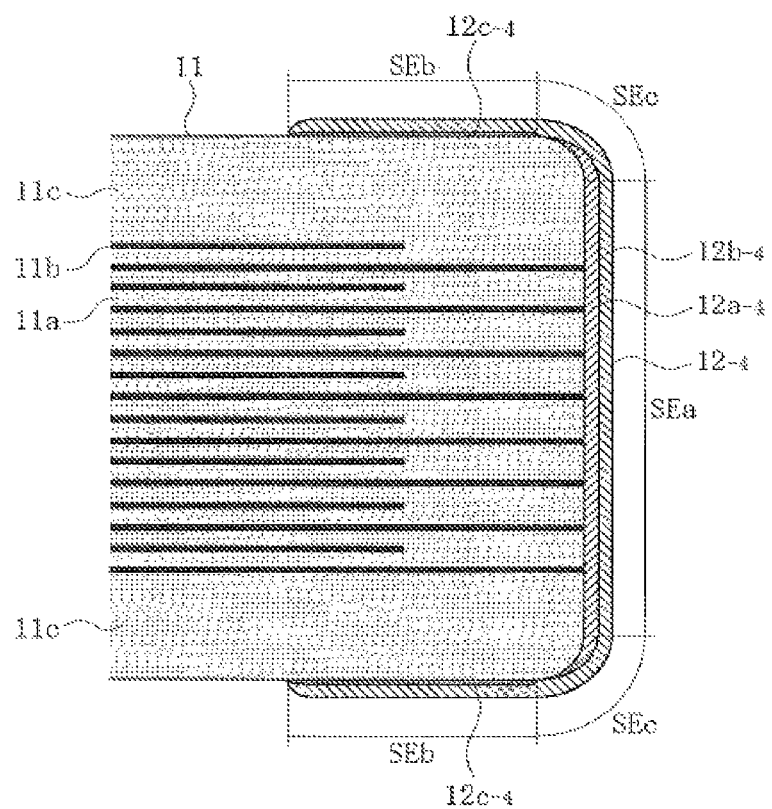

[Fig. 8]
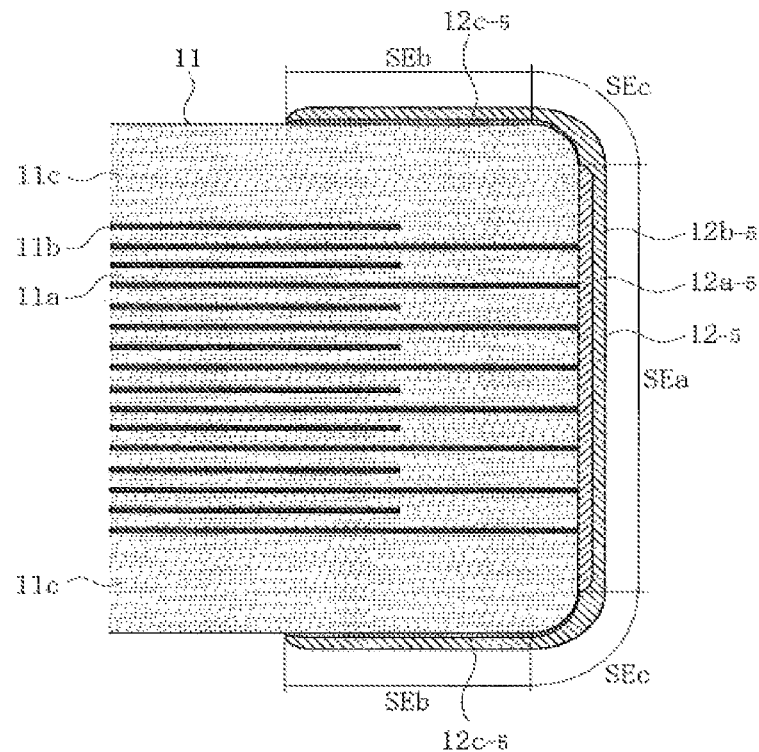
[Fig. 9]
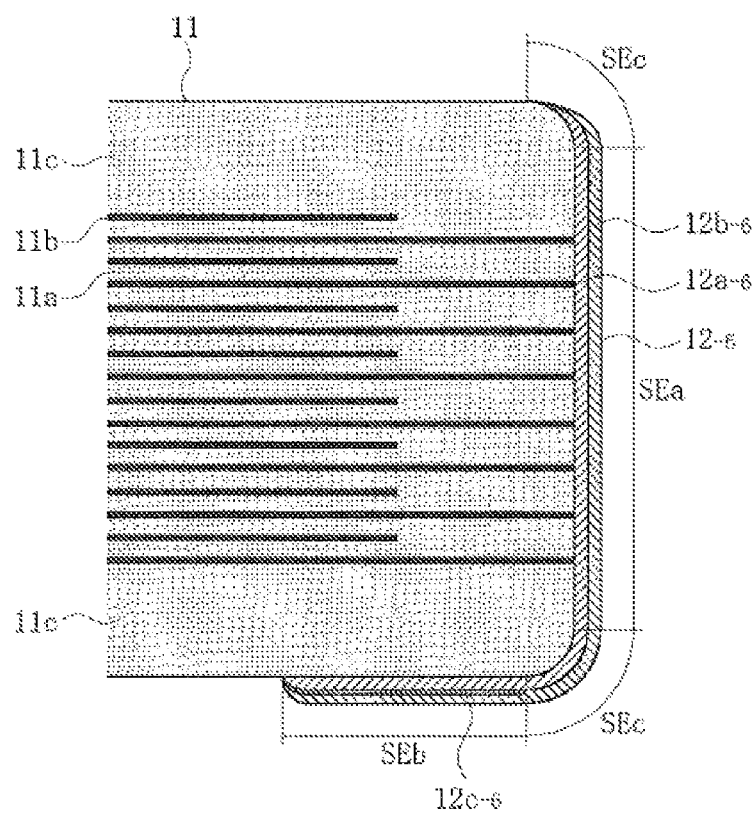

[Fig. 10]
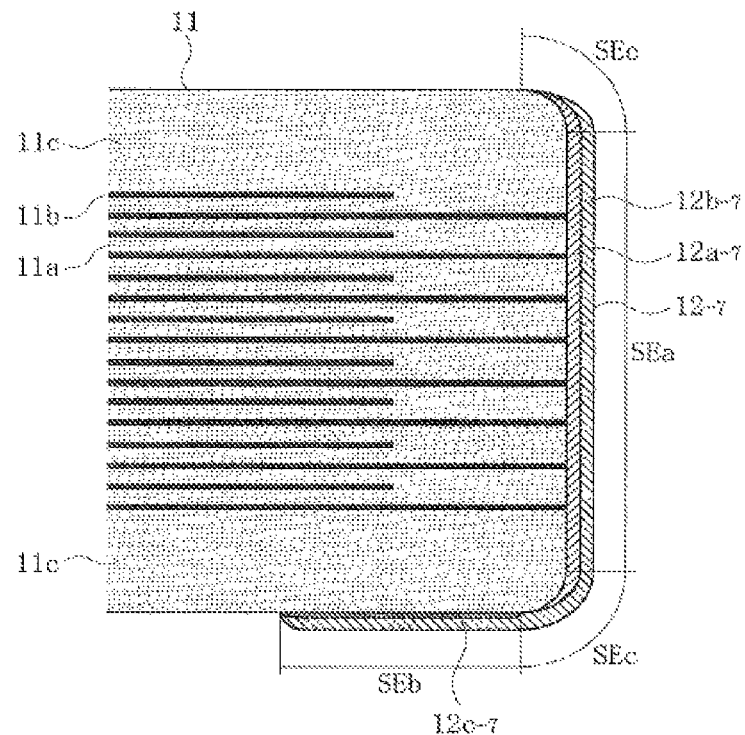
[Fig. 11]
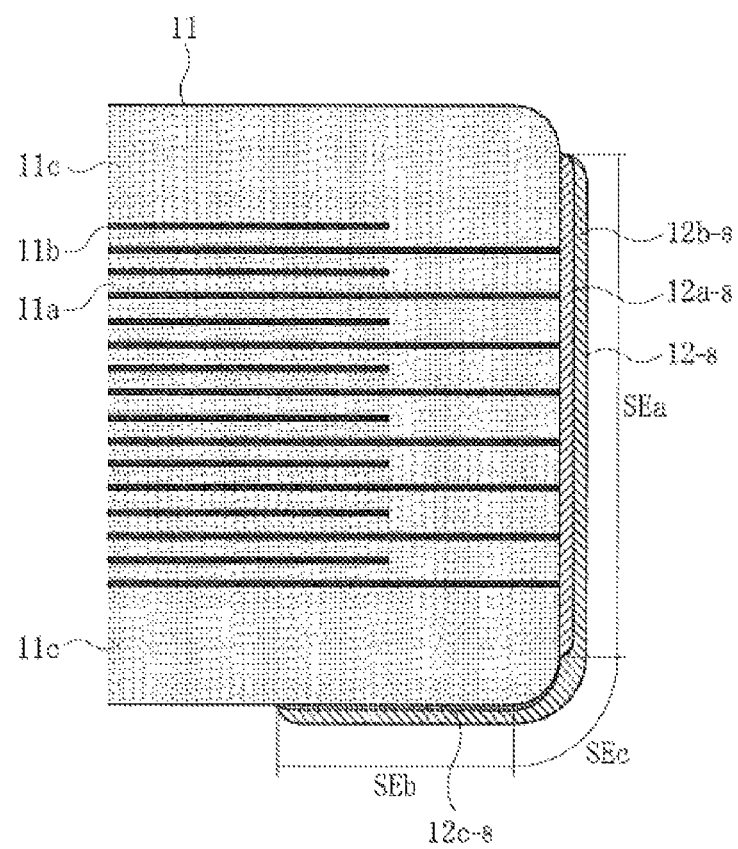

CERAMIC ELECTRONIC COMPONENT

This application is the U.S. National Phase under 35 U.S.C. §371 of International Application PCT/JP2014/057053, filed Mar. 17, 2014, which claims priority to Japanese Patent Application No. 2013-077490, filed Apr. 3, 2013. The International Application was published under PCT Article 21(2) in a language other than English.

TECHNICAL FIELD

The present invention relates to a ceramic electronic component using a ceramic chip as the component body.

BACKGROUND ART

Ceramic electronic components using a ceramic chip as the component body, such as capacitors, inductors, and registers, generally have two or more external electrodes on the exterior surface of their ceramic chip having a roughly rectangular shape. Each external electrode has one first planar part positioned on a surface that specifies the length dimension or width dimension of the ceramic chip, and at least one second planar part positioned on a surface that specifies at least the height dimension of the ceramic chip and continues to the first planar part, where a section cut along the height direction is roughly in the shape of a letter U or letter L.

Such ceramic electronic component is mounted onto a board in such a way that primarily the second planar part of each external electrode is connected electrically to a conductor pad of the board via solder or other bonding material. If the board deflects due to thermal shock, etc., in this mounted state, however, the stress from this deflection may be transmitted to the ceramic chip through the conductor pad, bonding material, and external electrode, and this stress may cause the ceramic part of the ceramic chip or any conductor part provided inside or outside the ceramic chip to crack, deform, or otherwise suffer damage that will ultimately lower the performance of the ceramic electronic component.

FIG. 1 in Patent Literature 1 mentioned below discloses a ceramic element 1 whose external terminal electrodes 5a, 5b have wrapped-around parts 15a, 15b where separated tips 15a2, 15b2 apart from the principle surfaces 11, 12 of the ceramic element 1 are provided, in order to prevent the ceramic element 1 from generating cracks caused by stress corresponding to the aforementioned stress. However, since the wrapped-around parts 15a, 15b of the external terminal electrodes 5a, 5b have basal joints 15a1, 15b1 that are joined to the principle surfaces 11, 12 of the ceramic element 1, it is difficult to suppress the transmission of stress corresponding to the aforementioned stress to the ceramic element 1 through the external terminal electrodes 5a, 5b.

BACKGROUND ART LITERATURE

Patent Literature

Patent Literature 1: Japanese Patent Laid-open No. 2010-109238

SUMMARY OF THE INVENTION

Problems to be Solved by the Invention

An object of the present invention is to provide a ceramic electronic component capable of suppressing the transmission, to the ceramic chip, of the stress from a deflection, should it occur as a result of thermal shock, etc., of the board on which the ceramic electronic component is mounted.

Means for Solving the Problems

To achieve the aforementioned object, the present invention provides a ceramic electronic component with two or more external electrodes, each having one first planar part positioned on a surface that specifies the length dimension or width dimension of a ceramic chip roughly in the shape of a rectangular solid, and at least one second planar part positioned on a surface that specifies at least the height dimension of the ceramic chip and continues to the first planar part, where the second planar part includes at least a plated metal film as well as an adhesive force mitigation film for mitigating the adhesive force of the plated metal film with respect to the surface on which the plated metal film is formed.

Effects of the Invention

According to the present invention, a ceramic component can be provided that can suppress the transmission, to the ceramic chip, of the stress from a deflection, should it occur as a result of thermal shock, etc., of the board on which the ceramic electronic component is mounted.

The aforementioned and other objects of the present invention, as well as the characteristics and effects according to each object, are made clear from the explanations provided below and the drawings attached hereto.

BRIEF DESCRIPTION OF THE DRAWINGS

FIG. 1 is a section view cut along the height direction, showing an embodiment of applying the present invention to a multi-layer ceramic capacitor.

FIG. 2 is an enlarged view of FIG. 1 showing key parts.

FIG. 3 is a drawing explaining the operations and effects of the embodiment shown in FIGS. 1 and 2.

FIG. 4 is a drawing corresponding to FIG. 2, showing a first variation of the embodiment shown in FIGS. 1 and 2.

FIG. 5 is a drawing corresponding to FIG. 2, showing a second variation of the embodiment shown in FIGS. 1 and 2.

FIG. 6 is a drawing corresponding to FIG. 2, showing a third variation of the embodiment shown in FIGS. 1 and 2.

FIG. 7 is a drawing corresponding to FIG. 2, showing a fourth variation of the embodiment shown in FIGS. 1 and 2.

FIG. 8 is a drawing corresponding to FIG. 2, showing a fifth variation of the embodiment shown in FIGS. 1 and 2.

FIG. 9 is a drawing corresponding to FIG. 2, showing a sixth variation of the embodiment shown in FIGS. 1 and 2.

FIG. 10 is a drawing corresponding to FIG. 2, showing a seventh variation of the embodiment shown in FIGS. 1 and 2.

FIG. 11 is a drawing corresponding to FIG. 2, showing an eighth variation of the embodiment shown in FIGS. 1 and 2.

MODE FOR CARRYING OUT THE INVENTION

First, an embodiment of applying the present invention to a multi-layer ceramic capacitor is explained by citing FIGS. 1 and 2.

As is evident from FIG. 1, a multi-layer ceramic capacitor 10 (hereinafter simply referred to as "capacitor 10") has two external electrodes 12 on the exterior surface of a ceramic chip 11 roughly in the shape of a rectangular solid.

The ceramic chip 11 has the dimensional relationships of "Length dimension (dimension in the lateral direction in FIG. 1)>Width dimension (dimension in the longitudinal direction in FIG. 1)=Height dimension (dimension in the vertical direction in FIG. 1)," or "Length dimension>Width dimension>Height dimension," and its eight corners are rounded. The ceramic chip 11 has multiple (16 in FIG. 1) internal electrode layers 11b laminated in the height direction alternately with capacitance-forming layers 11a, as well as protective layers 11c provided in a manner covering the internal electrode layers 11b at both ends in the height direction. The ends of some of the multiple internal electrode layers 11b (odd-numbered ones from the top in FIG. 1) are connected to one of the external electrodes 12 (on the left side in FIG. 1), while the ends of others (even-numbered ones from the top in FIG. 1) are connected to the other of the external electrodes 12 (on the right side in FIG. 1). FIG. 1 shows a total of 16 internal electrode layers 11b for the convenience of illustration; however, the actual total number is greater than this.

The material for the ceramic chip 11 except for the internal electrode layers 11b, or specifically the material for the capacitance-forming layers 11a and protective layers 11c, is dielectric ceramics, or preferably dielectric ceramics of $\epsilon$>1000 or Class 2 (high dielectric constant type), and the thickness dimension of each capacitance-forming layer 11a is roughly the same and the thickness dimension of each protective dielectric layer 11c is also roughly the same. Specific examples of the dielectric ceramics used for the capacitance-forming layers 11a and protective layers 11c include barium titanate, strontium titanate, calcium titanate, magnesium titanate, calcium zirconate, calcium titanate-ziroconate, barium zirconate, and titanium oxide. Also, the internal electrode layers 11b of the dielectric chip 11 use metal material, and the thickness dimension and shape in top view (roughly rectangular) of each internal electrode layer 11b are roughly the same. Specific examples of the metal used for the internal electrode layers 11b include nickel, copper, palladium, platinum, silver, gold and alloys thereof.

On the other hand, each external electrode 12 has one first planar part SEa of roughly rectangular profile positioned on a surface that specifies the length dimension of the ceramic chip 11, as well as four second planar parts SEb of roughly rectangular profile positioned on both surfaces that specify the height dimension, and both surfaces that specify the width dimension, of the ceramic chip 11 and continue to the first planar part SEa. In other words, each external electrode 12 has a continuous shape comprised of the one first planar part SEa of roughly rectangular profile and the four second planar parts SEb roughly constituting a square cylinder, and a section cut along the length direction is roughly shaped like a letter U. Additionally, since the eight corners of the ceramic chip 11 are rounded, a rounded ring-shaped part SEc (hereinafter referred to as "boundary part SEc") is present at the boundary of the first planar part SEa and each second planar part SEb.

It should be noted that, since the boundary part SEc is shared by the first planar part SEa and each second planar part SEb, it is not considered a part of the external electrode 12 in this specification and claims. To explain the film constitution of the external electrode 12 more clearly, however, the boundary part SEc is treated as a term indicating a partial area of the external electrode 12 in the descriptions below.

As is evident from FIG. 2, the first planar part SEa and boundary part SEc are constituted by a baked metal film 12a formed on the exterior surface of the ceramic chip 11 and a plated metal film 12b formed on the exterior surface of the baked metal film 12a. Also, the second planar part SEb is constituted by a baked metal film 12a formed on the exterior surface of the ceramic chip 11 and a plated metal film 12b formed on the exterior surface of the baked metal film 12a via an adhesive force mitigation film 12c. It should be noted that the baked metal film 12a constituting the first planar part SEa and the baked metal film 12a constituting the second planar part SEb are parts of one continuous baked metal film, while the plated metal film 12b constituting the first planar part SEa and the plated metal film 12b constituting the second planar part SEb are parts of one continuous plated metal film.

The baked metal film 12a is a metal film formed by applying a paste containing metal powder and then baking the paste, where specific examples of the metal used for the baked metal film 12a include nickel, copper, palladium, platinum, silver, gold, and alloys thereof. In addition, the plated metal film 12b is a metal film formed by electroplating, electroless plating or other plating method, where specific examples of the metal used for the plated metal film 12b include tin, silver, palladium, gold, and copper. The adhesive force mitigation film 12c is a metal film formed by sputtering, vacuum deposition, or other physical vapor deposition (PVD) method, where specific examples of the metal used for the adhesive force mitigation film 12c include tin, silver, palladium, gold, and copper. One essential point is to use, for the adhesive force mitigation film 12c, a metal film whose adhesive force with respect to the exterior surface of the baked metal film 12a is lower than its adhesive force with respect to the interior surface of the plated metal film 12b.

Next, the operations and effects achieved by the embodiment (capacitor 10) shown in FIGS. 1 and 2 are explained by citing FIG. 3.

The capacitor 10 is mounted onto a board 20 in such a way that primarily the second planar part SEb of each external electrode 12 is connected electrically to a conductor pad 21 of the board 20 via solder or other bonding material 30. If the end of the conductor pad 21 overhangs outward beyond each external electrode 12, as shown in FIG. 3, the bonding material 30 wets the exterior surface of the first planar part SEa of each external electrode 12 to form a fillet 30a.

If the board 20 undergoes a deflection BE (refer to the thick arrow in FIG. 3) due to thermal shock, etc., in this mounted state, the stress from this deflection BE may be transmitted to the ceramic chip 11 through the conductor pad 21, bonding material 30, and external electrode 12, and this stress may cause the capacitance-forming layers 11a and protective layers 11c of the ceramic chip 11 or the internal electrode layers 11b provided in the ceramic chip 11 to crack, deform, or otherwise suffer damage that will ultimately lower the performance, or specifically the capacitance, of the capacitor 10.

With the capacitor 10, on the other hand, the second planar part SEb of each external electrode 12 is constituted by a baked metal film 12a formed on the exterior surface of the ceramic chip 11 and a plated metal film 12b formed on the exterior surface of the baked metal film 12a via an adhesive force mitigation film 12c, where the adhesive force of the plated metal film 12b with respect to the exterior surface of the baked metal film 12a is mitigated by the adhesive force mitigation film 12c.

Because of this, the transmission of the stress from the deflection BE of the board 20, to the ceramic chip 11, through the conductor pad 21, bonding material 30, and external electrode 12, can be suppressed by (1) the operation to undo the adhesion of the adhesive force mitigation film 12c and baked metal film 12a constituting the second planar part SEb (not illustrated) and (2) the operation to separate the adhesive force mitigation film 12c constituting the second planar part SEb from the baked metal film 12a together with the plated metal film 12b (refer to a separation EX in FIG. 3).

Basically with the capacitor 10, where the transmission, to the ceramic chip 11, of the stress from the deflection BE of the board 20 can be suppressed by operation (1) or operations (1) and (2) as mentioned above, cracking, deformation, or other damage of the capacitance-forming layers 11a and protective layers 11c of the ceramic chip 11 and the internal electrode layers 11b provided in the ceramic chip 11 can be prevented as much as possible and therefore lowering of performance of the capacitor in the form of lower capacitance, etc., can be avoided as much as possible.

To verify these operations and effects, 10 samples each with a length dimension of 2.0 mm and width and height dimensions of 1.25 mm (corresponding to the capacitor 10) were prepared and subjected to the deflection strength test. It should be noted that barium titanate was used for the ceramic chip 11 of each sample except for the internal electrode layers 11b, and nickel was used for the internal electrode layers 11b. Also, nickel was used for the baked metal film 12a, tin was used for the plated metal film 12b (formed by electroplating) and copper was used for the adhesive force mitigation film 12c (formed by sputtering), of the external electrode 12 of each sample, and the thickness of the baked metal film 12a was 5 µm, thickness of the plated metal film 12b was 3 µm, and thickness of the adhesive force mitigation film 12c was 0.05 µm.

The deflection strength test here was conducted by soldering a sample to one side of a glass epoxy board conforming to JIS-C-6484 and then, with pieces used to support the points 45 mm to both sides from the location where the sample was soldered on the one side of the glass epoxy board, pressing down and thus deforming the area on the other side corresponding to the sample-soldered area at a constant speed of 0.5 mm/sec using a jig (pressuring part is formed by a curved surface of 230 mm in radius of curvature), to measure the amount by which the jig was pushed in during the deformation process (in mm) as well as the drop in capacitance of the sample.

As a result of the test, as many as six of the 10 samples did not drop their capacitance by 12.5% or more before the jig was pushed in by 10 mm, and it was also confirmed that the deflection strengths (mm) of these 10 samples far exceeded approx. 7.4 mm. Additionally, when the 10 tested samples were observed by an optical microscope for the condition of the second planar part SEb on the side of the glass epoxy board, it was confirmed that operation (1) or operations (1) and (2) had occurred as mentioned above.

In the meantime, for the purpose of comparison, 10 comparative samples were prepared in the same manner as the aforementioned samples were prepared, except that the adhesive force mitigation film 12c was eliminated, and when they were put through the same deflection strength test, all 10 comparative samples dropped their capacitance by 12.5% or more before the jig was pushed in by 10 mm, and it was also confirmed that the average deflection strength (mm) of the 10 comparative samples was approx. 3.6 mm, which was lower than 7.4 mm mentioned above.

Next, first through eighth variations of the embodiment (capacitor 10) shown in FIGS. 1 and 2 are explained by citing FIGS. 4 through 11 individually.

[First Variation (FIG. 4)] This first variation is structurally different from the embodiment (capacitor 10) shown in FIGS. 1 and 2 in that: the first planar part SEa of the external electrode 12-1 is constituted by a baked metal film 12a-1 formed on the exterior surface of the ceramic chip 11 and a plated metal film 12b-1 formed on the exterior surface of the baked metal film 12a-1; and the second planar part SEb and boundary part SEc of the external electrode 12-1 are constituted by a baked metal film 12a-1 formed on the exterior surface of the ceramic chip 11 and a plated metal film 12b-1 formed on the exterior surface of the baked metal film 12a-1 via an adhesive force mitigation film 12c-1, or specifically the adhesive force mitigation film 12c-1 is provided to extend not only to the second planar part SEb but also to the boundary part SEc.

Also with this first variation, operations equivalent to operation (1) or operations (1) and (2) mentioned above can be achieved and thus effects equivalent to those mentioned above can be achieved.

[Second Variation (FIG. 5)] This second variation is structurally different from the embodiment (capacitor 10) shown in FIGS. 1 and 2 in that: the first planar part SEa, second planar part SEb, and boundary part Sec, of the external electrode 12-2 is constituted by a baked metal film 12a-2 formed on the exterior surface of the ceramic chip 11, and a plated metal film 12b-2 formed on the exterior surface of the baked metal film 12a-2 via an adhesive force mitigation film 12c-2, or specifically the adhesive force mitigation film 12c-2, is provided to extend not only to the second planar part SEb but also to the boundary part SEc and first planar part SEa.

Also with this second variation, operations equivalent to operation (1) or operations (1) and (2) mentioned above can be achieved and thus effects equivalent to those mentioned above can be achieved.

It should be noted that, in the second variation, there is no direct adhesion between the baked metal film 12a-2 and plated metal film 12b-2 at the first planar part SEa, second planar part SEb, or boundary part Sec, of the external electrode 12-2, and therefore the internal conductivity of the external electrode 12-2 may drop if the films separate over an extremely wide area due to operation (2) mentioned above.

If the above is a possibility, it is good to provide an adhesive force reinforcement layer 12d, between the baked metal film 12a-2 and adhesive force mitigation film 12c-2 at the first planar part SEa and boundary part SEc of the external electrode 12-2, to reinforce the adhesive force between the baked metal film 12a-2 and adhesive force mitigation film 12c-2, as shown in FIG. 5, or provide an adhesive force reinforcement layer 12d, between the baked metal film 12a-2 and adhesive force mitigation film 12c-2 at the first planar part SEa of the external electrode 12-2, to reinforce the adhesive force between the baked metal film 12a-2 and adhesive force mitigation film 12c-2 (not illustrated). This adhesive force reinforcement film 12d is a metal film formed by sputtering, vacuum deposition, or other physical vapor deposition (PVD) method or chemical vapor deposition (CVD) method, where specific examples of the metal used for the adhesive force reinforcement film 12d include titanium, chromium, molybdenum, tungsten, and iron. Additionally, when this adhesive force reinforcement layer 12d is provided, it is preferable that, before the adhesive force reinforcement film 12d is formed on the exterior surface of the baked metal film 12a-2, the film-forming location on the exterior surface of the metal film 12a-2 is cleaned by reverse-sputtering, etc., in order to increase the adhesive force as much as possible with respect to the exterior surface of the baked metal film 12a-2.

[Third Variation (FIG. 6)] This third variation is structurally different from the embodiment (capacitor 10) shown in FIGS. 1 and 2 in that: the length dimension of the baked metal film 12a-3 is made shorter than the length dimension of the plated metal film 12b-3 or adhesive force mitigation film 12c-3 at the second planar part SEb of the external electrode 12-3, or specifically the end of the plated metal film 12b-3 is formed on the exterior surface of the ceramic chip 11 via the adhesive force mitigation film 12c-3.

Also with this third variation, where the adhesion force of the adhesive force mitigation film 12c-3 with respect to the exterior surface of the ceramic chip 11 is as low as its adhesive force with respect to the exterior surface of the baked metal film 12a-3, operations equivalent to operation (1) or operations (1) and (2) mentioned above can be achieved, as well as (3) the operation to undo the adhesion between the adhesive force mitigation film 12c-3 constituting the second planar part SEb and the ceramic chip 11, and (4) the operation to separate the adhesive force mitigation film 12c-3 constituting the second planar part SEb from the ceramic chip 11 together with the plated metal film 12b-3 (not illustrated), and thus effects equivalent to those mentioned above can be achieved.

[Fourth Variation (FIG. 7)] This fourth variation is structurally different from the embodiment (capacitor 10) shown in FIGS. 1 and 2 in that: the second planar part SEb of the external electrode 12-4 is constituted by a plated metal film 12b-4 formed on the exterior surface of the ceramic chip 11 via an adhesive force mitigation film 12c-4, or specifically a baked metal film 12a-4, is provided only at the first planar part SEa and boundary part SEc.

Also with this fourth variation, operations equivalent to operation (3) or operations (3) and (4) mentioned above can be achieved and thus effects equivalent to those mentioned above can be achieved.

[Fifth Variation (FIG. 8)] This fifth variation is structurally different from the embodiment (capacitor 10) shown in FIGS. 1 and 2 in that: the second planar part SEb and boundary part SEc of the external electrode 12-5 are constituted by a plated metal film 12b-5 formed on the exterior surface of the ceramic chip 11 via an adhesive force mitigation film 12c-5, or specifically a baked metal film 12a-5 is provided only at the first planar part SEa.

Also with this fifth variation, operations equivalent to operation (3) or operations (3) and (4) mentioned above can be achieved and thus effects equivalent to those mentioned above can be achieved.

[Sixth Variation (FIG. 9)] This sixth variation is structurally different from the embodiment (capacitor 10) shown in FIGS. 1 and 2 in that: the second planar part SEb of the external electrode 12-6 is provided only on one surface (bottom side in FIG. 9) that specifies the height dimension of the ceramic chip 11; and the external electrode 12-6 has a continuous shape comprised of one first planar part SEa of roughly rectangular profile and one second planar part SEb of roughly rectangular profile, with a section cut along the height direction roughly shaped like a letter L. It should be noted that the first planar part SEa and boundary part SEc of the external electrode 12-6 are constituted by a baked metal film 12a-6 and plated metal film 12b-6, while the second planar part SEb is constituted by a baked metal film 12a-6, plated metal film 12b-6 and adhesive force mitigation film 12c-6.

Also with this sixth variation, operations equivalent to operation (1) or operations (1) and (2) mentioned above can be achieved and thus effects equivalent to those mentioned above can be achieved.

[Seventh Variation (FIG. 10)] This seventh variation is structurally different from the embodiment (capacitor 10) shown in FIGS. 1 and 2 in that: the second planar part SEb of the external electrode 12-7 is provided only on one surface (bottom side in FIG. 10) that specifies the height dimension of the ceramic chip 11; the external electrode 12-7 has a continuous shape comprised of one first planar part SEa of roughly rectangular profile and one second planar part SEb of roughly rectangular profile, with a section cut along the height direction roughly shaped like a letter L; and the second planar part SEb of the external electrode 12-7 is constituted by a plated metal film 12b-7 formed on the exterior surface of the ceramic chip 11 via an adhesive force mitigation film 12c-7. It should be noted that the first planar part SEa and boundary part SEc of the external electrode 12-7 are constituted by a baked metal film 12a-7 and plated metal film 12b-7.

Also with this seventh variation, operations equivalent to operation (3) or operations (3) and (4) mentioned above can be achieved and thus effects equivalent to those mentioned above can be achieved.

[Eighth Variation (FIG. 11)] This eighth variation is structurally different from the embodiment (capacitor 10) shown in FIGS. 1 and 2 in that: the second planar part SEb and boundary part SEc of the external electrode 12-8 is provided only on one surface (bottom side in FIG. 11) that specifies the height dimension of the ceramic chip 11; the external electrode 12-8 has a continuous shape comprised of one first planar part SEa of roughly rectangular profile and one second planar part SEb of roughly rectangular profile, with a section cut along the height direction roughly shaped like a letter L; and the second planar part SEb and boundary part SEc of the external electrode 12-8 are constituted by a plated metal film 12b-8 formed on the exterior surface of the ceramic chip 11 via an adhesive force mitigation film 12c-8. It should be noted that the first planar part SEa of the external electrode 12-8 is constituted by a baked metal film 12a-8 and plated metal film 12b-8.

Also with this eighth variation, operations equivalent to operation (3) or operations (3) and (4) mentioned above can be achieved and thus effects equivalent to those mentioned above can be achieved.

Next, common modifications that can be made to the embodiment (capacitor 10) shown in FIGS. 1 and 2 and to the first through eighth variations shown in FIGS. 4 through 11 are explained.

[First Modification] If the ends of multiple internal electrode layers 11b are exposed on a surface that specifies the width dimension of the ceramic chip 11 (i.e., the orientations of multiple internal electrode layers 11b are different by 90 degrees when viewed from above), it is good to position one first planar part SEa of the external electrode 12, 12-1 to 12-5 on a surface that specifies the width dimension of the ceramic chip 11 and position two of the four second planar parts SEb, in a manner continuing thereto, on both surfaces that specify the height dimension of the ceramic chip 11, with the two remaining parts positioned on both surfaces that specify the length dimension of the ceramic chip 11. In this case, the external electrode also has a continuous shape comprised of one first planar part SEa of roughly rectangular profile and four second planar parts SEb roughly constituting a square cylinder, and therefore its section cut along the height direction is roughly shaped like a letter U as is the case of the external electrode 12, 12-1 to 12-5.

[Second Modification] If the ends of multiple internal electrode layers 11*b* are exposed on a surface that specifies the width dimension of the ceramic chip 11 (i.e., the orientations of multiple internal electrode layers 11*b* are different by 90 degrees when viewed from above), it is good to position one first planar part SEa of the external electrode 12-6 to 12-8 on a surface that specifies the width dimension of the ceramic chip 11 and position one second planar part SEb, in a manner continuing thereto, on one surface that specifies the height dimension of the ceramic chip 11. In this case, the external electrode also has a continuous shape comprised of one first planar part SEa of roughly rectangular profile and one second planar part SEb of roughly rectangular profile, and therefore its section cut along the height direction is roughly shaped like a letter L as is the case of the external electrode 12-6 to 12-8.

[Third Modification] Two second planar parts SEb of each external electrode 12, 12-1 to 12-5 may be positioned only on both surfaces that specify the height dimension of the ceramic chip 11. In this case, the external electrode has a continuous shape comprised of one first planar part SEa of roughly rectangular profile and two second planar parts SEb of roughly rectangular profile, and a section cut along the height direction is roughly shaped like a letter U.

Additionally, if the ends of multiple internal electrode layers 11*b* are exposed on a surface that specifies the width dimension of the ceramic chip 11 (i.e., the orientations of multiple internal electrode layers 11*b* are different by 90 degrees when viewed from above), an external electrode whose section cut along the height direction is roughly shaped like a letter U can be obtained by positioning one first planar part SEa of the external electrode as mentioned in the preceding paragraph on one surface that specifies the width dimension of the ceramic chip 11.

[Fourth Modification] An external electrode may be constituted by a plated metal film 12*b*, 12*b*-1 to 12*b*-8 and other plated metal film formed on the exterior surface thereof. This other plated metal film is not limited to one, and two or more films may be provided, but preferably the material for the outermost plated metal film is different from the material for the plated metal film or films on the inside of the outermost film. Specific examples of the metal used for the outermost plated metal film include tin, silver, palladium, gold, and copper, while specific examples of the metal used for the plated metal film or films on the inside of the outermost film include platinum, silver, palladium, chromium, gold, copper, and nickel.

[Fifth Modification] Although a metal film formed by a physical vapor deposition (PVD) method was indicated for the adhesive force mitigation film 12*c*, 12*c*-1 to 12*c*-8, any other film other than the aforementioned metal film can be used so long as it can mitigate the adhesive force of the plated metal film 12*b*, 12*b*-1 to 12*b*-8 with respect to the surface on which the plated metal film is formed (i.e., exterior surface of the baked metal film or exterior surface of the ceramic chip). Effects equivalent to those mentioned above can be achieved also by using, as the aforementioned adhesive force mitigation film, silica, polyimide, or other non-metal material formed like a film, for example.

The foregoing explained the characteristics, effects, etc., of the present invention by citing examples of multi-layer ceramic capacitors, but the present invention can also be applied to non-capacitor ceramic electronic components using a ceramic chip as the component body, such as inductors and resistors, and the transmission to the ceramic chip, through the external electrode, of the stress from deflection of the board can still be suppressed and thus cracking, deformation, or other damage of the ceramic part of the ceramic chip or any conductor part provided inside or outside of the ceramic chip, and consequently lowering of performance of the ceramic electronic component, can be avoided as much as possible.

Additionally, three or more external electrodes can be provided on the exterior surfaces of a ceramic chip roughly shaped in a rectangular solid according to the form of the conductor part provided inside or outside the ceramic chip, provided that the external electrode has a section roughly shaped like a letter L as described in the external electrode 12-6 to 12-8 and the second modification, or the external electrode has a section roughly shaped like a letter U as described in the third modification, in which case the transmission to the ceramic chip, through each external electrode, of the stress from deflection of the board can still be suppressed.

DESCRIPTION OF THE SYMBOLS

10—Multi-layer ceramic capacitor, 11—Ceramic chip, 11*a*—Capacitance-forming layer, 11*b*—Internal electrode layer, 11*c*—Protective layer, 12, 12-1 to 12-8—External electrode, SEa—First planar part, SEb—Second planar part, SEc—Boundary part, 12*a*, 12*a*-1 to 12*a*-8—Baked metal film, 12*b*, 12*b*-1 to 12*b*-8—Plated metal film, 12*c*, 12*c*-1 to 12*c*-8—Adhesive force mitigation film.

What is claimed is:

1. A ceramic electronic component with two or more external electrodes, each external electrode having:
   one first planar part positioned on and planarly extending along a surface that specifies a length dimension or width dimension of a ceramic chip roughly in a shape of a rectangular solid,
   at least one second planar part positioned on and planarly extending along a surface that specifies at least a height dimension of the ceramic chip, said second planar part being configured to be connected electrically to a board via a bonding material, and
   a corner part connecting the first planar part and the second planar part such that the second planar part continues to the first planar part via the corner part,
   wherein the second planar part comprises at least a plated metal film as well as an adhesive force mitigation film for mitigating an adhesive force of the plated metal film, wherein the adhesive force mitigation film is a physical vapor deposition metal film which is deposited as an underlying layer of the plated metal film such that an adhesive force between an interior surface of the adhesive force mitigation film and a surface on which the adhesive force mitigation film is deposited and in contact with, is lower than an adhesive force between an exterior surface of the adhesive force mitigation film on which the plated metal film is formed and in contact with, and an interior surface of the plated metal film.

2. A ceramic electronic component according to claim 1, wherein the second planar part further comprises a baked metal film formed on an exterior surface of the ceramic chip, wherein the plated metal film is formed on an exterior surface of the baked metal film via the adhesive force mitigation film.

3. A ceramic electronic component according to claim 2, wherein the first planar part is constituted by a baked metal film formed on an exterior surface of the ceramic chip, and the plated metal film formed on an exterior surface of the baked metal film.

4. A ceramic electronic component according to claim 2, wherein another plated metal film is formed on an exterior surface of the plated metal film.

5. A ceramic electronic component according to claim 2, wherein there are four or two of the second planar part, and the two or more external electrodes have a section, cut along a height direction, roughly shaped like a letter U.

6. A ceramic electronic component according to claim 2, wherein there is only one of the second planar part, and the two or more external electrodes have a section, cut along a height direction, roughly shaped like a letter L.

7. A ceramic electronic component according to claim 1, wherein the plated metal film is formed on an exterior surface of the ceramic chip via the adhesive force mitigation film.

8. A ceramic electronic component according to claim 7, wherein the first planar part is constituted by a baked metal film formed on an exterior surface of the ceramic chip, and the plated metal film formed on an exterior surface of the baked metal film.

9. A ceramic electronic component according to claim 7, wherein another plated metal film is formed on an exterior surface of the plated metal film.

10. A ceramic electronic component according to claim 7, wherein there are four or two of the second planar part, and the two or more external electrodes have a section, cut along a height direction, roughly shaped like a letter U.

11. A ceramic electronic component according to claim 7, wherein there is only one of the second planar part, and the two or more external electrodes have a section, cut along a height direction, roughly shaped like a letter L.

12. A ceramic electronic component according to claim 1, wherein the first planar part is constituted by a baked metal film formed on an exterior surface of the ceramic chip, and the plated metal film formed on an exterior surface of the baked metal film.

13. A ceramic electronic component according to claim 1, wherein another plated metal film is formed on an exterior surface of the plated metal film.

14. A ceramic electronic component according to claim 1, wherein there are four or two of the second planar part, and the two or more external electrodes have a section, cut along a height direction, roughly shaped like a letter U.

15. A ceramic electronic component according to claim 1, wherein there is only one of the second planar part, and the two or more external electrodes have a section, cut along a height direction, roughly shaped like a letter L.

* * * * *